(12) United States Patent
Peternel et al.

(10) Patent No.: US 9,759,336 B2
(45) Date of Patent: Sep. 12, 2017

(54) FLOW CONTROL VALVE

(71) Applicant: Poclain Hydraulics Industrie, Verberie (FR)

(72) Inventors: Luka Peternel, Ziri (SI); Matej Erznoznik, Ziri (SI); Franc Majdic, Moravee (SI); Alen Ljoki, Semie (SI)

(73) Assignee: Poclain Hydraulics Industrie (FR)

( * ) Notice: Subject to any disclaimer, the term of this patent is extended or adjusted under 35 U.S.C. 154(b) by 0 days.

(21) Appl. No.: 15/006,594

(22) Filed: Jan. 26, 2016

(65) Prior Publication Data
US 2016/0223091 A1  Aug. 4, 2016

(30) Foreign Application Priority Data

Jan. 29, 2015 (FR) ..................................... 15 50708
Oct. 22, 2015 (FR) ..................................... 15 60112

(51) Int. Cl.
*F16K 11/07* (2006.01)
*F15B 13/02* (2006.01)
*F15B 13/00* (2006.01)

(52) U.S. Cl.
CPC ........ *F16K 11/0716* (2013.01); *F15B 13/022* (2013.01); *F15B 2013/008* (2013.01); *Y10T 137/8671* (2015.04); *Y10T 137/86702* (2015.04)

(58) Field of Classification Search
CPC ............... F16K 11/0716; F15B 13/022; Y10T 137/86702; Y10T 137/8671
See application file for complete search history.

(56) References Cited

U.S. PATENT DOCUMENTS 3,554,213 A   1/1971  Yoshino
3,654,958 A * 4/1972  Bitonti ................ F15B 13/0402
                                                137/596.14
(Continued)

FOREIGN PATENT DOCUMENTS

GB       1123256 A    8/1968
JP       S4730019 U   12/1972
JP       S56 76704 A   6/1981

OTHER PUBLICATIONS

French Search Report for Application No. FR1550708 dated Nov. 18, 2015.

(Continued)

*Primary Examiner* — Kevin Lee
(74) *Attorney, Agent, or Firm* — Lerner, David, Littenberg, Krumholz & Mentlik, LLP

(57) ABSTRACT

The invention relates to a flow control valve adapted for use as a flow-dividing and flow-combining valve in hydraulic devices, comprising: a valve body having a first longitudinally extending bore, an outer spool slidably positioned within the bore, the outer spool having an axially extending passageway, a pair of axially extending inner spools slidably positioned within the passageway, the valve body having a first port and a pair of second ports, the outer spool having at least a first opening communicating with the first port and with the passageway, and at least two pairs of second openings therethrough. At least one second opening of each pair is of non-constant longitudinal section narrowing from the outer face of the outer spool on at least a part of the thickness of the second opening, so that a lateral side of the second opening offers an obstacle where a part of the fluid flow entering the second opening crashes before entering the inner spool.

15 Claims, 12 Drawing Sheets

(56) References Cited

U.S. PATENT DOCUMENTS

| | | | | |
|---|---|---|---|---|
| 4,243,060 A | * | 1/1981 | McKendrick | B66D 3/18 137/625.69 |
| 4,860,792 A | * | 8/1989 | Ichihashi et al. | F15B 13/0402 137/596.17 |
| 8,960,217 B2 | * | 2/2015 | Inagaki | F15B 5/006 137/596.18 |

OTHER PUBLICATIONS

"Flow Divider | Combiner SAE 16-Cartridge ? 350 bar ST16-01", Handbook Hydac International, Jan. 1, 2004 (Jan. 1, 2004), pp. 1-2, XP007909931, <http://pddocserv/specdocs/data/handbooks/hydac/2004/E5967-1-0-07-04_ST16-01.pdf>.

* cited by examiner

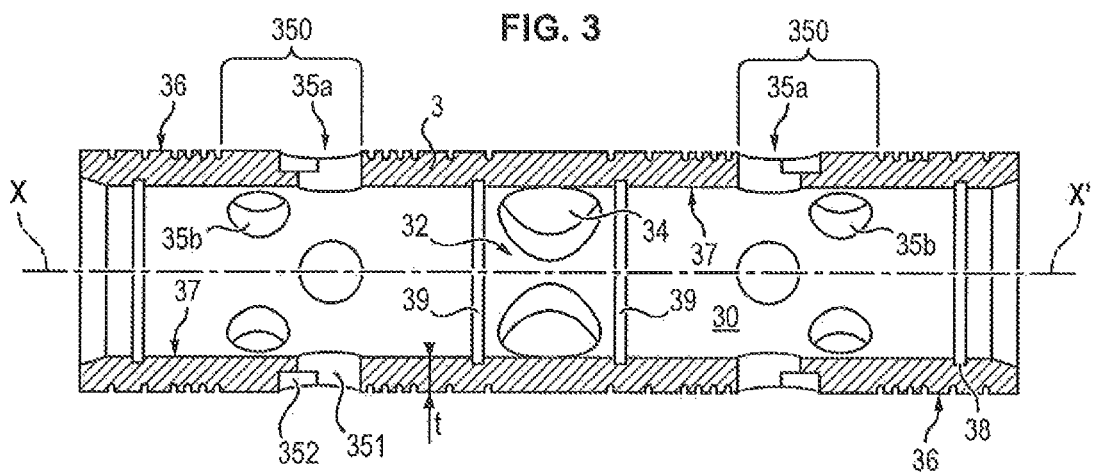
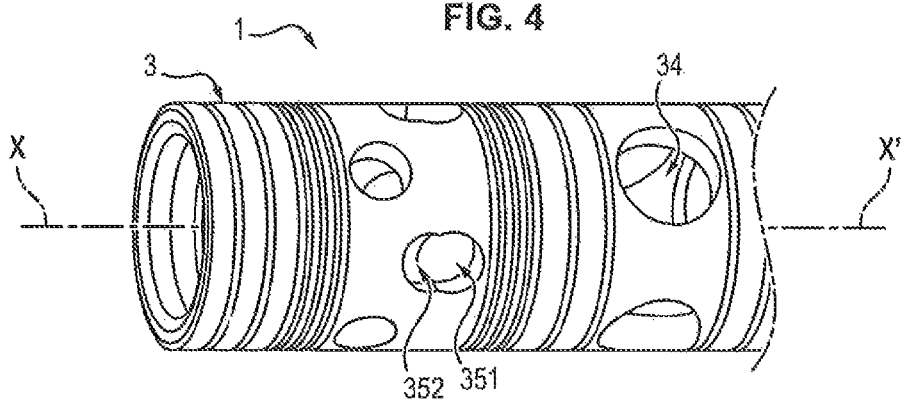
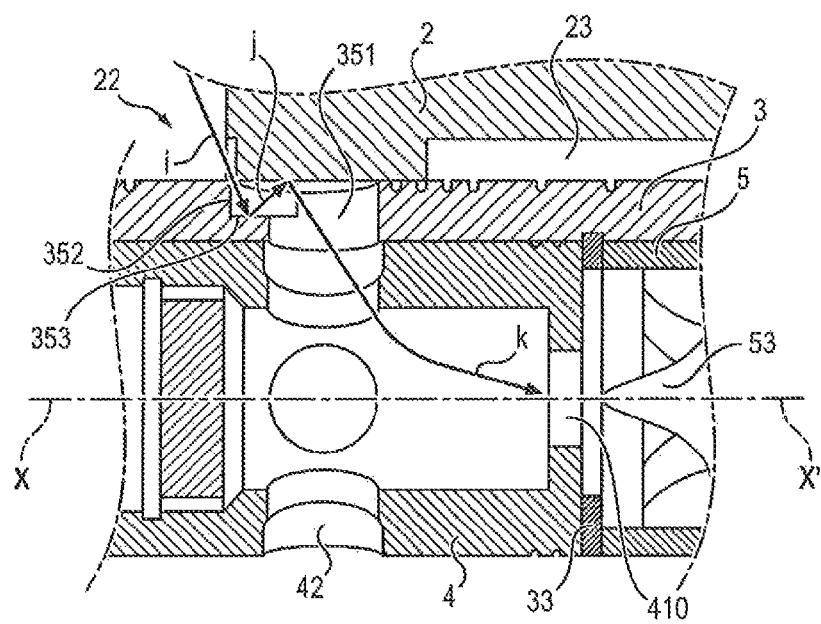

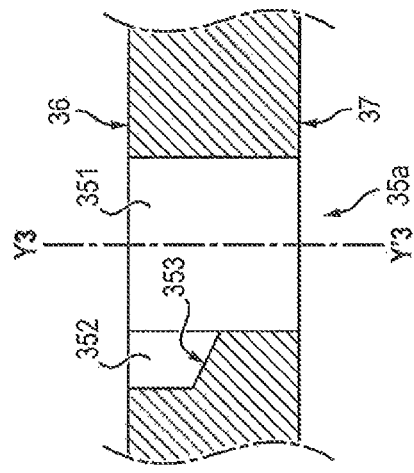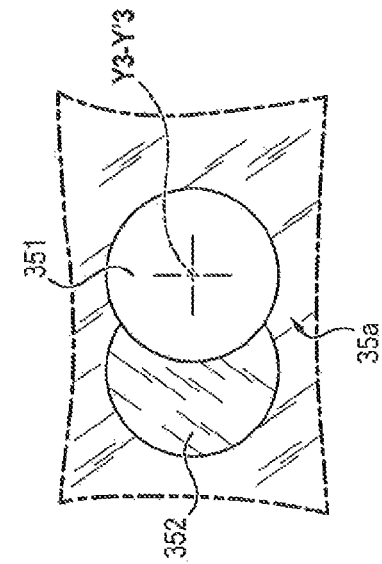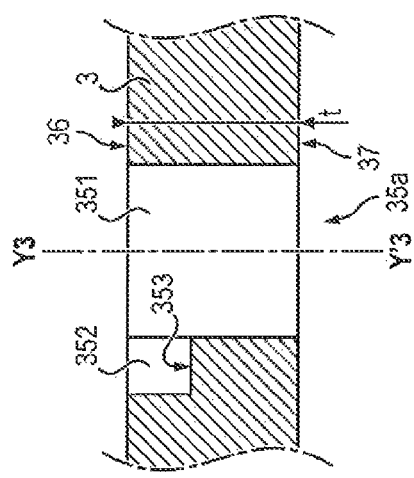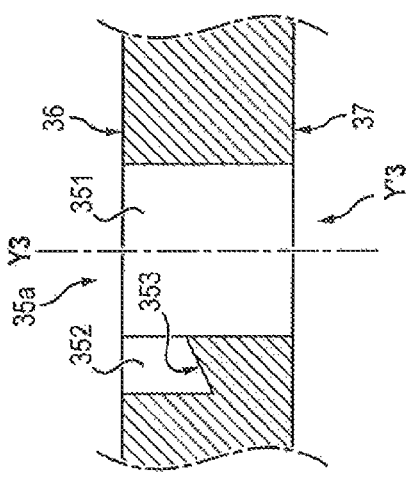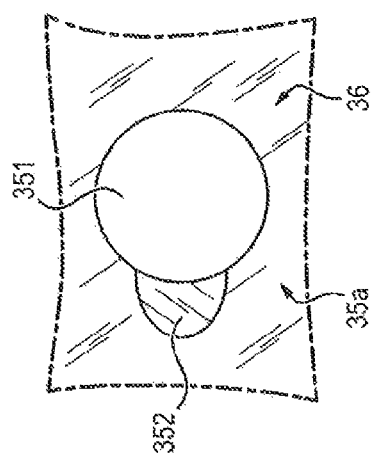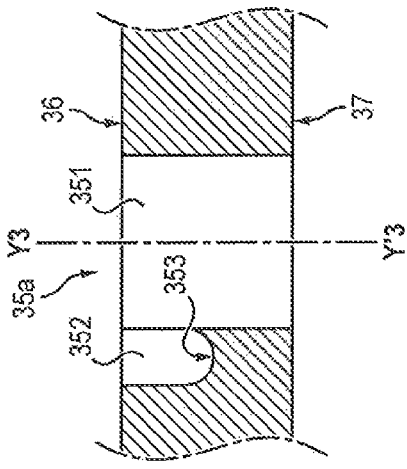

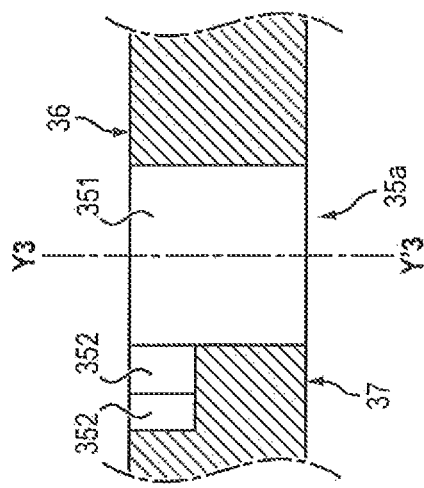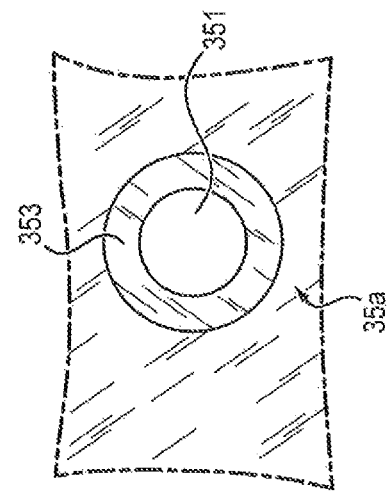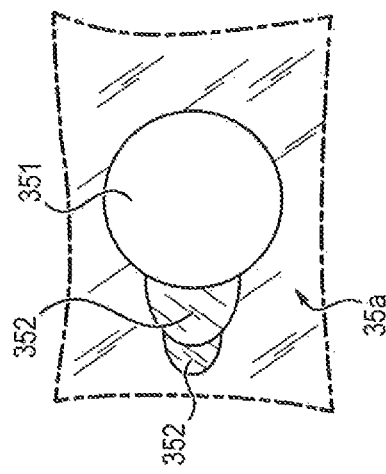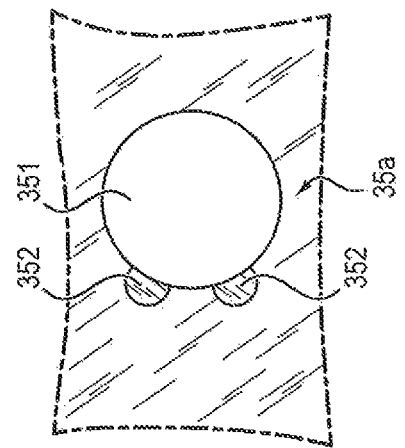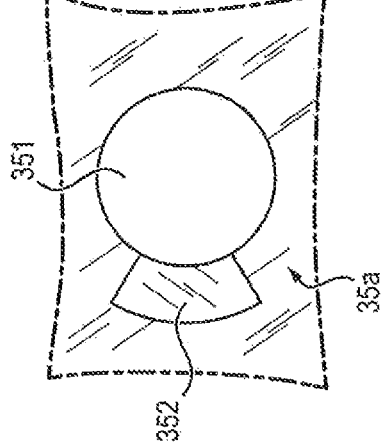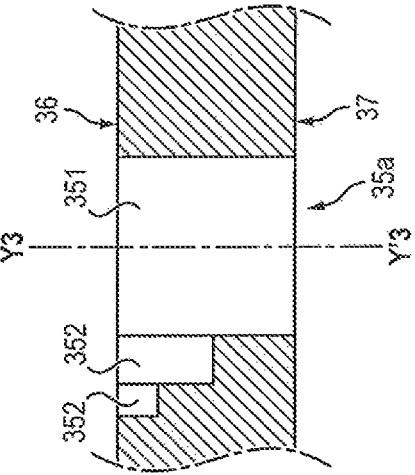

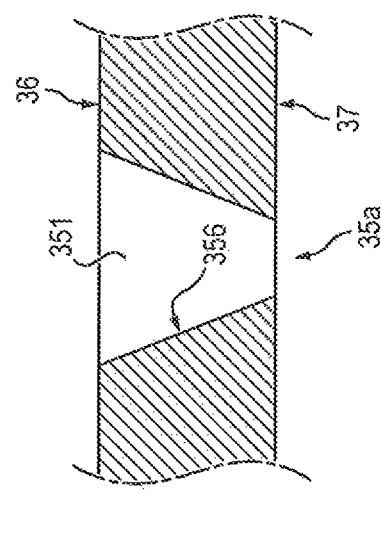
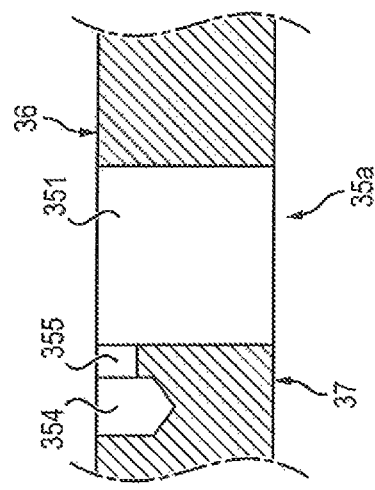
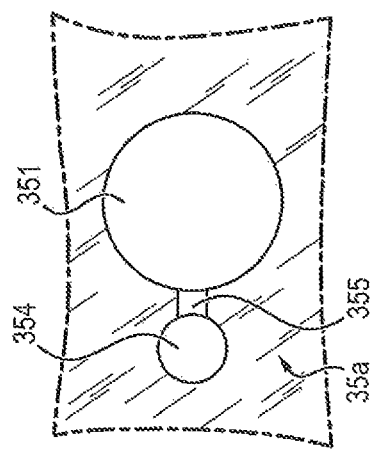
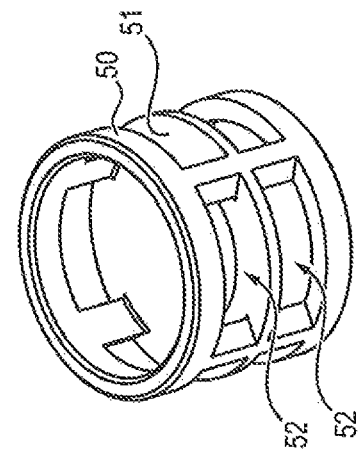
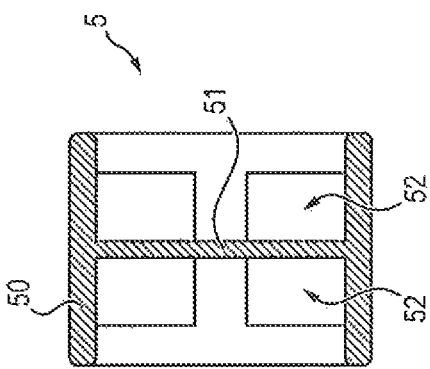

FLOW CONTROL VALVE

CROSS REFERENCE TO RELATED APPLICATIONS

This application claims the benefit of the filing date of French Patent Application No. 1550708 filed Jan. 29, 2015 and French Patent Application No. 1560112 filed Oct. 22, 2015, the disclosures of which are hereby incorporated herein by reference.

TECHNICAL FIELD

The invention relates to the technical field of the flow control valves and more particularly to a flow control valve capable of serving as a flow-dividing and flow-combining valve for the synchronous operation of hydraulic devices or equipments.

BACKGROUND OF THE INVENTION

A flow control valve serving alternatively as a flow-dividing valve and as a flow-combining valve is already known from U.S. Pat. No. 3,554,213.

This flow control valve comprises a valve body which has a longitudinally extending bore for receiving therein a longitudinally extending main spool, for sliding motion. A coil spring urges the main spool to be positioned in the centre of the bore in said valve body.

Two subsidiary spools are disposed in end-to-end relation in an axially extending passageway provided in said main spool for sliding motion relative to each other.

The valve body has a first port connected to a source of hydraulic fluid (serving alternatively as an inlet and an outlet port) and a pair of second ports connected to a hydraulic device and through which hydraulic fluid can flow in one direction or in the reverse one.

Each of the subsidiary spools has a partition wall with an orifice formed therein and a passage therethrough adapted to selectively register with one passage of each of two pairs of passages formed in the main spool and one formed in the valve body.

When the flow control valve operates in dividing mode, the flow of hydraulic fluid introduced in the first port flows inside the main spool where it is divided into two streams into each subsidiary spool. As the fluid passes through the orifice formed in the partition wall of said subsidiary spool, the resistance offered by the orifices to the fluid flow causes the subsidiary spools to move away from each other. The hydraulic fluid flows through the passage provided in the subsidiary spool and then in through the passages provided in the main spool to be discharged through the second ports of the valve body.

In case the pressures in the two second ports are not equal then the main spool will move to the right or to the left till the pressures inside the two subsidiary spools are equalized. Then the main spool will come back to its central position.

When the flow control valve operates in combining mode, the flow of hydraulic fluid introduced in the two second ports are combined inside the passageway of the main spool before to be discharged through the first port of the valve body. In this case, the two subsidiary spools move towards each other.

Again, in case the pressures in the two second ports are not equal then the main spool will move to the right or to the left. The movement of the main spool (for example the rightward movement), gradually reduces the degree of opening of the right passage of the left pair of passages provided in the main spool and increases the difference of pressure between the left second port and the fluid chamber of the left subsidiary spool. This results in a reduction of pressure of fluid inside the left subsidiary spool. When the pressure of hydraulic fluid introduced into the fluid chamber of the left subsidiary spool through the left port is lower than the pressure of hydraulic fluid introduced into the fluid chamber of the right subsidiary spool through the right port, then the main spool will move to the left.

The rightward and leftward movements of the main spool are alternatively repeated rapidly to maintain the main spool in the normal central position.

However, such kind of flow control valve, in combining mode and for high fluid flow rate has the disadvantage to be less accurate because of the oscillations of the main spool.

Further, theoretically the pressure drop through the orifices provided in each partition wall of said subsidiary spools should be independent from main spool axial position. Nevertheless, because of high turbulent flow, this is not always true.

SUMMARY OF THE INVENTION

Accordingly, the object of the present invention is to avoid the previously mentioned drawbacks.

Thus, the invention relates to a flow control valve adapted for use as a flow-dividing and flow-combining valve in hydraulic devices, comprising:

a valve body having a longitudinally extending bore therethrough, an outer spool slidably positioned within said bore, said outer spool having an axially extending passageway therethrough, return means which tend permanently to position said outer spool centrally in the longitudinal direction of said bore, a pair of axially extending inner spools slidably positioned within the passageway provided in said outer spool, each inner spool having an axially extending passageway therethrough, said valve body having a first port therethrough and a pair of second ports therethrough, said first port and second ports communicating with the bore, said outer spool having at least a first opening communicating at one end with the first port of said valve body and at its other end with a central zone of said outer spool, the outer spool also having at least two pairs of second openings therethrough, one pair on each side of said first opening, with the two second openings of each pair being offset from one another in the longitudinal direction, so that for each pair at least one of said second openings is in communication with one of said second ports, depending on the axial position of the outer spool, in the bore, each inner spool having at least one opening therein arranged to be in register with one of the two second openings of said outer spool, depending on the axial position of said inner spool, for affording a flow path from the passageway within said inner spool to the second port in said valve body, According to the invention at least one second opening of each pair of two second openings of the outer spool is of non-constant longitudinal section, said section narrowing from the outer face of the outer spool on at least a part of the thickness of said second opening, so that a lateral side of said at least one second opening offers an obstacle where a part of the fluid flow entering said second opening from the second port crashes before it comes into an axially extending passageway of the inner spool.

According to other advantageous and non-limiting features of the invention, taken alone or in combination:

- said second opening of non-constant section comprises a central drill and at least one peripheral blind drill partially overlapping said central drill and opening out only on the outer face of the outer spool, said blind drill constituting said obstacle;
- said second opening of non-constant section comprises a central drill, a blind drill spaced apart from said central drill and joined to it by a channel, the blind drill and the channel opening out on the outer face of the outer spool;
- at least one blind drill is disposed along or close to the diametrical axis of the central drill which is parallel to the longitudinal axis of the outer spool and on the side of the central drill which is the nearest of the end of the outer spool;
- the lateral wall of said second opening of non-constant section is divergent from the inner face of the outer spool to its outer face;
- said second opening of non-constant longitudinal section comprises a central drill provided with a counter bore opening out on the outer face of the outer spool;
- the second opening of non-constant longitudinal section of the outer spool has an area at the outer face of the outer spool greater than its area at the inner face of said outer spool;
- each inner spool is provided with a partition wall extending transversally across the passageway therethrough and this partition wall is provided with at least one hole therethrough, this hole affording communication between the central zone of said outer spool and the passageway therethrough of the inner spool;
- the partition wall comprises a central hole extending along the longitudinal axis of said inner spool and/or at least one peripheral hole extending parallel to this longitudinal axis (X-X');
- a partition element is disposed inside the central zone of the outer spool in front of the at least one first opening to separate the flow of hydraulic liquid circulating inside the flow control valve into two flows;
- the partition element is a portion of tube inserted in coaxial relationship with and inside the passageway of said outer spool, the tube being provided with a plane partition wall extending in a plane transversely bisecting said tube, and the tube being provided with at least one aperture on both sides of said wall, the aperture opening in front of the opening provided in the outer spool;
- the partition element is a portion of tube inserted in coaxial relationship with and inside the passageway of said outer spool, the tube being provided with a partition wall extending in a plane transversely bisecting said tube, and the tube being provided with at least one aperture on both sides of said wall, the apertures opening in front of the opening provided in the outer spool, said partition wall being provided with two cones disposed on the partition wall such that their respective basis are in contact with said partition wall;
- the flow control valve comprises an additional by-pass spool;
- said by-pass spool is in coaxial relationship with the outer spool and is mounted outside of said outer spool and inside the first bore of the valve body, said by-pass spool being slidably positionable within said bore; and
- said by-pass spool is slidably positioned within an additional longitudinally extending bore provided in said valve body parallel to said first bore of the valve body,
- the valve comprises a control spool slidably mounted inside a second bore of the valve body, parallel to the first bore receiving the by-pass spool, the first bore and the second bore being connected by at least one connecting port,
- said control spool is moveable between a so-called "activation" position in which it connects the two second ports therethrough of the valve body to a hydraulic pump of said hydraulic device and a so-called "deactivation" position in which it connects the two second ports therethrough of the valve body to a tank of hydraulic fluid of said hydraulic device.

BRIEF DESCRIPTION OF THE DRAWINGS

Additional objects as well as features and advantages of the invention will become apparent from the description set forth hereunder when considered in conjunction with the accompanying drawings, which represent several possible embodiments. On these drawings:

FIG. 3 is a longitudinal sectional view of the outer spool of the flow control valve according to the invention, FIG. 4 is a perspective view of a part of the outer spool of FIG. 3, FIG. 5 is a partial longitudinal sectional view of the flow control valve of FIG. 1, at a greater scale, FIGS. 6 to 20 are schematic top views or sectional views of through openings of different shapes provided inside the outer spool of the flow control valve according to the invention, FIGS. 21 and 22 are respectively a longitudinal sectional view and a perspective view of a partition element configured to be disposed inside the passageway provided inside the outer spool.

DESCRIPTION OF THE PREFERRED EMBODIMENT

Figure 1:
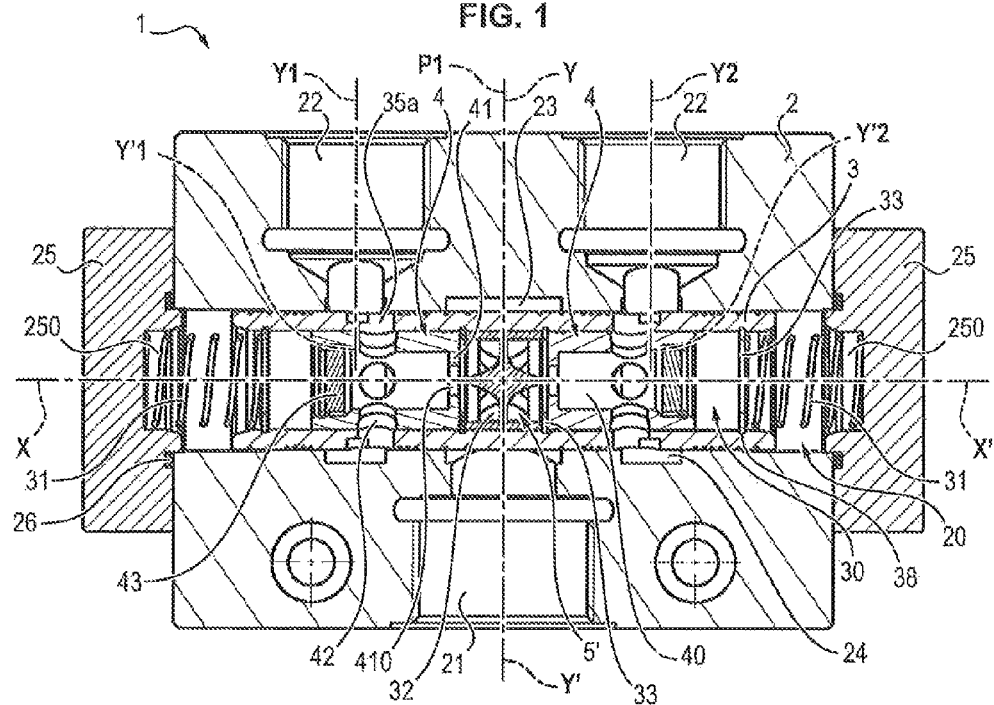
FIGS. 1 and 2 are longitudinal sectional views of the flow control valve according to the invention, in flow combining mode, with the outer spool respectively in central position or in offset position.

The structure of the flow control valve 1 according to one possible embodiment of the present invention will now be explained with reference to FIGS. 1 to 3.

It is to be noted that the elements making up the flow control valve of this invention are arranged symmetrically on the left and right sides of the valve. In other words, the flow control valve 1 comprises a plane of symmetry P1 represented by the line Y-Y' on the FIGS. 1 and 2.

The flow control valve 1 comprises a valve body 2 provided with a central tubular bore 20 (so-called "first bore") extending longitudinally along an axis X-X'.

The valve body 2 is provided with a first through port 21 and a pair of second through ports 22.

The first port 21 extends along an axis Y-Y' perpendicular to the longitudinal axis X-X'.

The first port 21 ends in an annular groove 23 provided on the inside face of the bore 20.

Thus, the first port 21 is in fluid communication at one end with the outside of the valve body 2 where it can be connected to a hydraulic device and at its other end with the inside of the bore 20, more precisely with the annular groove 23.

Preferably, each of said second ports 22 is axially positioned between the first port 21 and one end of the valve body 2. Said second ports 22 extend along longitudinal axis Y1-Y'1 and Y2-Y'2 respectively, parallel to the axis Y-Y'.

Each second port 22 ends at one end at the outside of the valve body 2 and at its other end in an annular groove 24 provided on the inner face of the bore 20.

Each second port 22 is configured to be able to be connected to a hydraulic device.

Both ends of the bore 20 are blocked by a cover 25 attached to said valve body 2. An O-ring 26 is mounted in said cover 25 for providing a seal to the valve body 2 and preventing leakage of hydraulic fluid. Also, each cover 25 is provided with a recess 250 on its inner face, i.e. the face facing the bore 20.

An outer spool 3 of tubular shape is coaxially disposed within the bore 20.

The outer diameter of the outer spool 3 corresponds, within a clearance, to the inner diameter of the bore 20, so that the outer spool 3 can slide inside said first bore 20.

The passageway inside the outer spool 3 is referenced 30.

Return means 31 tend permanently to position said outer spool 3 centrally in the longitudinal direction of said bore 20.

Preferably, said return means 31 are a compression coil spring one end of which is retained (fixed) in the recess 250 and the other end of which is retained (fixed) in an annular inner groove 38 provided on the inner face 37 of the outer spool 3, (see FIG. 3).

As can be best seen on FIG. 3, the outer spool 3 has at least a first opening 34 communicating at one end with the first port 21 or more precisely with the annular groove 23 provided inside the bore 20 and at its other end, with a central zone 32 inside the passageway 30. More preferably, said outer spool 3 is provided with two openings 34 diametrically disposed or with four openings, as represented on the drawings.

Said outer spool 3 has also at least two pairs 350 of second openings therethrough, one pair 350 on each side of said first opening 34. In each pair 350, the two second openings 35a, 35b are offset from one another in the longitudinal direction of the outer spool 3. Further, and as can be seen on FIG. 3, the second openings 35a, 35b of each pair are preferably angularly offset.

In each pair 350, the second opening which is the closest to the ends of the outer spool 3 is referenced 35b whereas the one which is the closest of the central area 32 is referenced 35a.

Preferably, on each side (left and right) of said first opening 34, the outer spool 3 is provided with two pairs 350 of diametrically disposed second openings 35a, 35b and more preferably, as represented on FIG. 3, with four pairs of second openings disposed at 90 degrees one from the other, i.e. a total of eight pairs 350 of second openings.

The particular shape of said second openings will be described more precisely later.

Two annular grooves 39 are provided on the inner face 37 of the outer spool 3. Their role will be described later.

Figure 2:
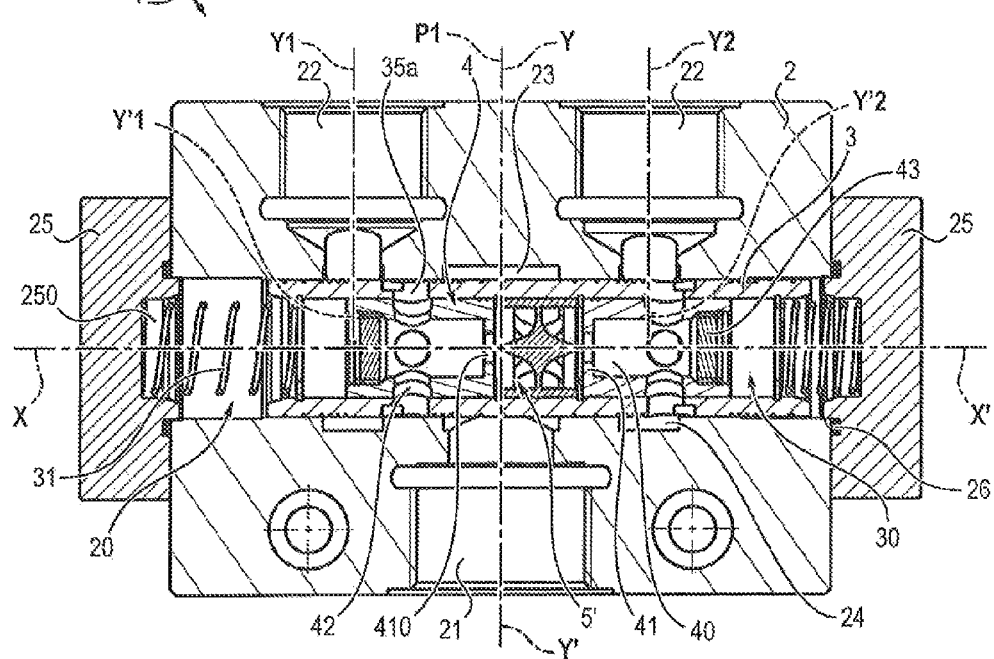

As can be seen in FIGS. 1 and 2, the flow control valve 1 according to the invention also comprises a pair of axially extending inner spools 4 slidably positioned within the passageway 30 provided in said outer spool 3. The two inner spools 4 are respectively positioned on both sides of the central zone 32 provided inside the passageway 30.

Each inner spool 4 has a tubular shape with an axially extending passageway 40 therethrough.

Preferably, each inner spool 4 is provided with a partition wall 41 extending transversally across said passageway 40, preferably at the end of the inner spool 4 located near the central zone 32.

Each inner spool 4 is coaxial with the outer spool 3. According to a first variant embodiment, the partition wall 41 is provided with a hole 410 therethrough, extending along the longitudinal axis X-X' for affording communication between the central zone 32 and the axially extending passageway 40 of said inner spool 4.

Figure 29:
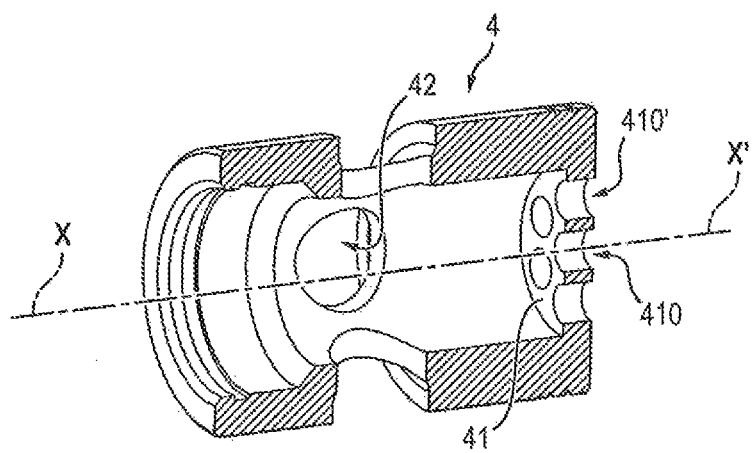
FIG. 29 is a perspective view of half of a variant embodiment of an inner spool according to a longitudinal sectional plane.

According to a second variant embodiment, illustrated in FIG. 29, the partition wall 41 is pierced by a central hole 410 coaxial to the longitudinal axis X-X' of the inner spool 4 and by several peripheral holes 410' arranged around the central hole 410 such that they extend parallel to the axis X-X'. In the variant of FIG. 29, there are six of these peripheral holes 410', (four only being visible in the figure in section). But this number is not limited. The peripheral holes 410' are preferably arranged symmetrically relative to the central hole 410.

Figure 30:
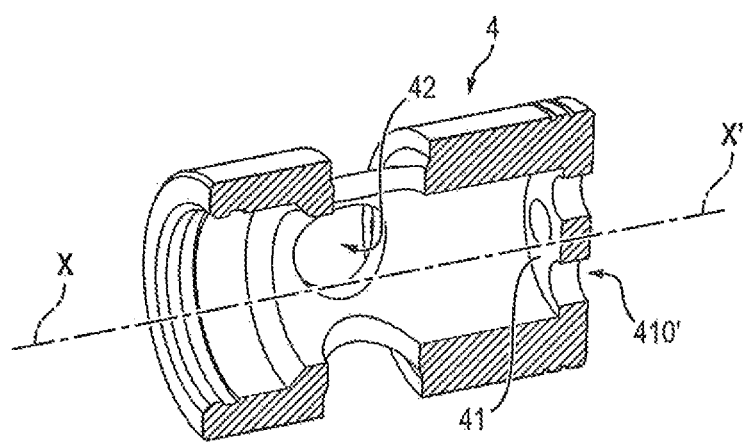
FIG. 30 is a view similar to FIG. 29 but showing another variant embodiment of an inner spool.

According to a third variant embodiment illustrated in FIG. 30, the partition wall 41 comprises several peripheral holes 410', preferably at least two, arranged preferably symmetrically relative to the axis X-X', but no central hole 410.

The fact of having several holes 410, 410' instead of one enables especially:
- having a drop in pressure through the partition wall 41 which is independent of the axial displacement of the inner spool 4, including in combining mode, corresponding to better precision of the control valve,
- decreasing the "transition distance" after passing through the holes 410, 410', in which the speed of the fluid decreases,
- decreasing turbulence after passing through the holes 410, 410', especially in combining mode, especially preventing the creation of recirculation zones.

Each inner spool 4 has at least one through opening 42 arranged therein in the lateral wall of said inner spool 4. Preferably, each inner spool 4 has at least two openings 42 diametrically disposed and more preferably four openings 42, as represented on FIGS. 1 and 2, (disposed at 90° from each other).

Each inner spool 4 is also provided with a plug 43 which blocks its end opposite the partition wall 41.

Preferably, snap rings 33 are disposed inside the grooves 38, 39 of the outer spool 3. They constitute means for limiting the extent of movement of each inner spool 4 in the longitudinal direction within the passageway 30 in said outer spool 3.

The openings 42 are arranged inside each inner spool 4 to be in register with one of the second openings 35a, 35b of said outer spool 3, depending on the axial position of the inner spool 4, for affording a flow pass from the passageway 40 to the second port 22 provided in said valve body 2.

Advantageously, a partition element 5 or 5' is disposed inside the central zone 32 of the outer spool 3, in front of the first openings 34 and between each inner spool 4.

The function of this partition element will be described later. This partition element 5, 5' may also act to limit the extent of movement of each inner spool 4.

All the elements constituting the flow control valve 1 are preferably made of metal or plastic material.

A first embodiment of the partition element (referenced 5) will now be described with reference to the FIGS. 21 and 22. The partition element 5 is a portion of tube 50, i.e. a tube of small length. The tube 50 is provided with a plane partition wall 51 of circular shape extending in a plane transversally bisecting said tube 50. Further the tube 50 is provided on both sides of the wall 51 with at least one through aperture 52, preferably several apertures 52, for example four apertures, of large dimensions, as in the example represented on FIG. 22.

Figure 23:
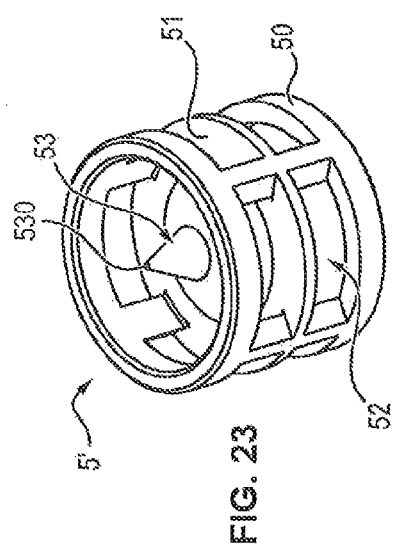
FIG. 23 is a perspective view of a second embodiment of the partition element.

A second embodiment of the partition element, referenced 5', will now be described with reference to the FIG. 23.

The partition element 5' differs from the partition element 5 in that the partition wall referenced 51' is provided with two cones 53, disposed on the partition wall 51' such that their respective bases are in contact with said partition wall 51. In other words, the tip 530 of each cone 53 is oriented towards one of the inner spool 4.

As can be seen on FIGS. 1 and 2, the tube 50 is inserted in a coaxial relationship with the inside passageway 30 of the outer spool 3 such that the plane of the partition wall 51 is coplanar with the plane P1 of the valve body 2.

The partition elements 5 or 5' act as a splitting element when the flow control valve 1 works in dividing mode. The stream of hydraulic fluid enters the first port 21 and the groove 23 and then enters the central space 32 through the first openings 34. Since the partition wall 51 is disposed in the plane of symmetry P1 of the flow control valve, the stream (flow) of hydraulic fluid is perfectly divided into two flows which are directed toward the hole(s) 410 of each inner spool 4.

To the contrary, in combining mode, the two flows of hydraulic fluid issuing from each inner spool 4 impact the partition wall 51 or the cones 53 on both sides and are then directed towards the set of first openings 34, therefore preventing that stagnation pressure from one side flow exerts an influence on the flow from the other side.

The cones 53 promote deflection of the flow from one direction to the perpendicular direction.

In dividing mode, the pressure differential between both sides of the partition wall 41 and the resistance offered by the holes 410 to the fluid causes the two inner spools 4 to move away from each other in the direction of the cover 25. In this position, not represented on the Figures, the opening 42 of each inner spool 4 is in register with the second opening 35b of each pair 350 of openings.

To the contrary, in combining mode, the pressure differential across the inner spools 4 forces them against each other, in the position represented on FIGS. 1 and 2. In this position, the opening 42 registers respectively with the second opening 35a.

According to the invention, at least one opening 35a on each side of the first opening(s) 34 and preferably all the openings 35a of the outer spool 3 have a non-constant longitudinal section, said section narrowing from the outer face 36 of the outer spool 3 on at least a part of the thickness t of said second opening 35a (which corresponds to the thickness of the wall of the outer spool 3), so that a lateral side of said at least one second opening 35a offers an obstacle where a part of the fluid flow entering said second opening 35a from one of the second port 22 crashes before it comes into the axially extend passageway 40 of the inner spool 4.

A first embodiment of the second opening 35a will now be described in reference with the FIGS. 3 to 7. Said second opening 35a comprises a central drill 351 provided through all the thickness t of the outer spool 3 and at least one peripheral blind drill 352 partially overlapping said central drill 351 and opening out only on the outer face 36 of the outer spool 3.

As already explained before in relation with the prior art flow control valve, when a flow control valve operates in combining mode, and if the pressures in the two second ports 22 are not equal, then the outer spool 3 will move to the right or to the left to equilibrate the pressure of hydraulic fluid introduced into the central space 32 and thereafter in the first port 21. Thereafter, when the pressure is equilibrated, the outer spool comes back to the central position represented in FIG. 1.

When the outer spool 3 is in the position represented on FIG. 2, wherein it is on the right side of the flow control valve, the second openings 35a of the right side of the outer spool 3 are in register with the right second port 22 or the corresponding annular groove 24. To the contrary, the second opening 35a located on the left side of the outer spool 3 is only partly in register with the left hand second port 22 of the valve body 2.

When the outer spool 3 moves back to the left, it get through an operating position represented on FIG. 5 where only the peripheral blind drill 352 starts to register with the second port 22 of the left side of the valve body 2.

In this situation, and as represented on FIG. 5, the entering flow issuing from the second port 22 (arrow i) impacts on the bottom 353 of the blind drill 352, before to impact the inner face of the bore 20 (arrow j) and then to be sent back (arrow k) toward the hole 410 of the inner spool 4. The same applies if there are several holes 410, 410'.

With this structure and the creation of an obstacle (bottom 353), the turbulences inside the inner spool 4 are avoided because the entering flow do not enter the passageway 40 too abruptly, or at least is less dependent from the outer spool axial displacement.

Other shapes of second openings 35a will now be described in relation with FIGS. 8 to 20.

The bottom 353 of the blind drill 352 may be perpendicular to the longitudinal axis Y3-Y3 of the central drill 351, as represented on FIG. 7.

However, the bottom 353 of the blind drill 352 can be tilted toward the central drill 351 and the inner face 37, (as represented on FIG. 8) or tilted toward the central drill 351 and the outer face 36 of the outer spool 3, as represented on FIG. 10. Further, the bottom 353 can also be curved, its concavity directed towards the outer face 36 of the outer spool 3. The shape of the blind drill 352 may be a part of a circle, as represented on FIGS. 6 and 11, of the same diameter as the central drill 351, as represented on FIG. 11, or of a smaller diameter, as represented on FIG. 6.

The blind drill 352 may be also have a shape of a part of a ring as represented on FIG. 12.

Further, it is also possible to have several blind drills 352, either of smaller and smaller diameters from the central drill 351 to the outside, as represented on FIG. 13 or disposed separately as represented on FIG. 16.

When there are several blind drills 352, they can be of the same depth, as represented on FIG. 14 or of different depths as represented on FIG. 15. In this case, the outermost blind drill 352 is of lower depth than the middle blind drill 352.

The second opening 35a can also comprise a central drill 351 and a counter bore 353 surrounding said central drill, as represented on FIG. 17.

As represented on FIGS. 18 and 19, the second opening 35a can comprise a central drill 351 and a blind drill 354 spaced a part from the central drill 351 and joined to it by a channel 355 opening out on the outer face 36 of the outer spool 3. The blind drill 354 and the channel 355 may be of same or different depths.

Further, the bottom 353 of the blind drills 352 or 354 can also be tilted or curved as previously described or be conical.

Finally, and as represented on FIG. 20, the second opening 35a can have a lateral wall 356 divergent from the inner face 37 of the outer spool to its outer face 36.

In respect of the embodiment of the shape of the second opening 35a, it has to be noted that the elements (blind drill, groove or biased wall) which constitute the obstacle are disposed or formed along the diametric axis of the central drill 351 which is parallel to the axis X-X' or close to it and on the side of the central drill 351 which is directed toward the ends of the outer spool 3. In other words, and as can be seen on FIG. 3, the obstacle element, as the blind drill 352, is provided on the left side of the left second opening or on the right side of the right second opening.

The effects of specific shapes of the second opening 35a on the stream of hydraulic fluid will be described later.

In all the previously described embodiments, the area of the second opening 35a is greater at the outer face 36 of the outer spool 3 than its area at the inner face 37 of said outer spool. Nevertheless, the second opening 35a could diverge toward the inner face 37 after the area of the obstacle.

Further, it is to be noted that the second openings 35b could have the same shape as the second openings 35a. Nevertheless, it is not absolutely necessary because these second openings are used only in dividing mode and because the problems of turbulences and loss of accuracy of the valve appears only in combining mode.

The flow control valve of the invention can be used alone, as previously described or can also be used in combination with an additional by-pass spool.

Such a by-pass spool allows using the flow-dividing and flow-combining valve according to the invention or by-passing it.

Figure 26:
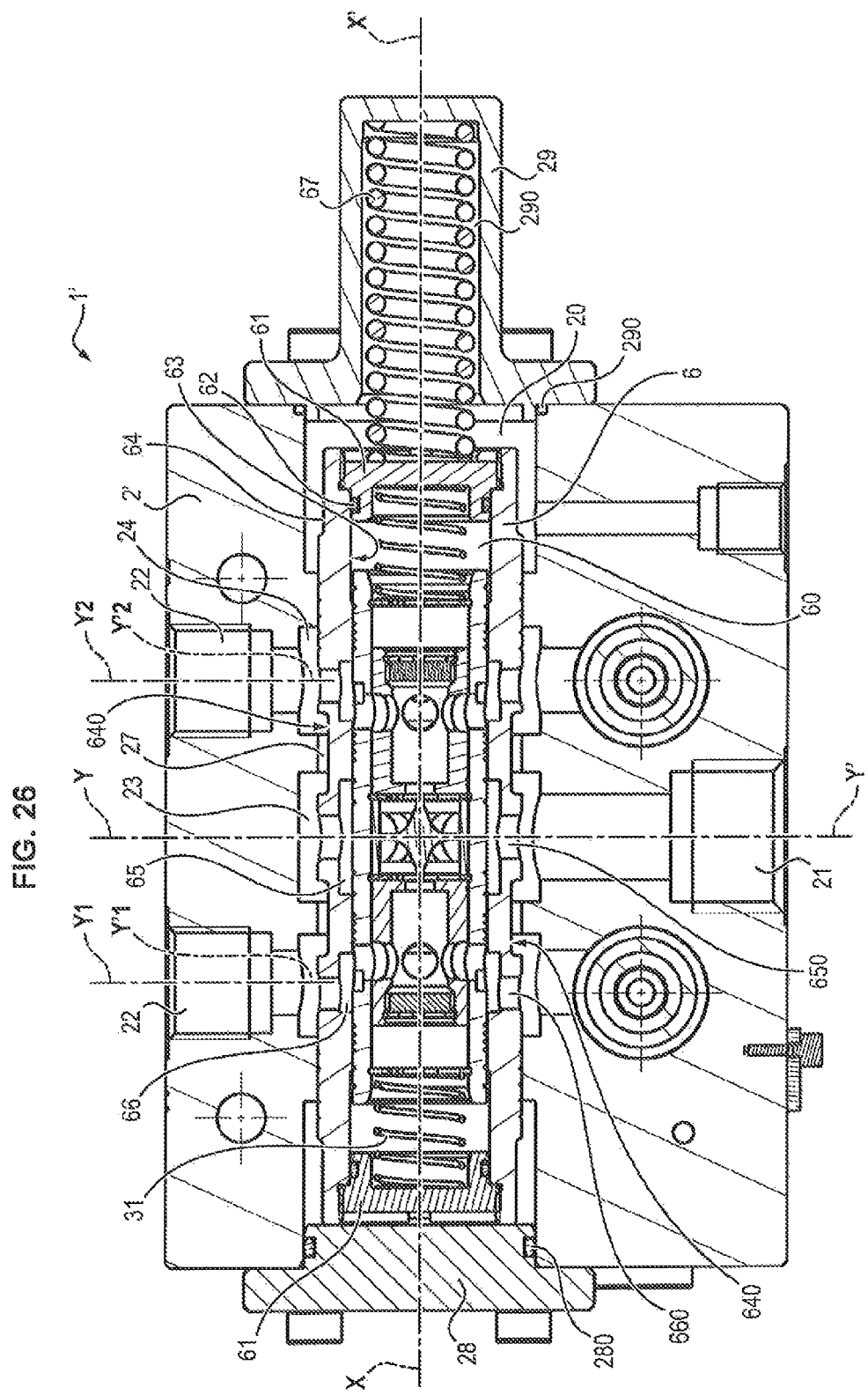
FIG. 26 is a longitudinal sectional view of a second embodiment of the flow control valve according to the invention, which comprises a by-pass spool.

According to a first embodiment of the invention represented on FIG. 26, the by-pass spool 6 is disposed inside the bore 20 and outside the outer spool 3 in coaxial relationship with said bore and said outer spool. Thus, the by-pass spool 6 extends along the longitudinal axis X-X'. This embodiment of the flow control valve is referenced 1'.

The by-pass spool 6 has an axially extending passageway 60 therethrough.

The outer ends of the two compression helicoidal springs 31 are no more received in the recess 250 of the cover 25 as in the valve 1 but in plugs 61 inserted respectively at both ends of the passageway of the by-pass spool 6.

O-rings 62 are mounted between the outside annular face of the plugs 61 and the inner cylindrical face of the passageway 60 of the by-pass spool 6 for providing tightness of the by-pass spool 6.

The valve body is referenced 2' and differs from the valve body 2 by the fact that an annular groove 27 opening out inside the first bore 20 is provided between the annular groove 23 and each annular groove 24, to put said grooves into fluid communication. The grooves 27 are less deep than the grooves 23 and 24.

The by-pass spool 6 of tubular shape presents an inner cylindrical face 63 and an outer cylindrical face 64.

The by-pass spool 6 presents in its central area an annular groove 65 opening out inside the passageway 60. Said annular groove 65 is perpendicular to the axis X-X'. Further, the by-pass spool 6 comprises at least one through opening 650 affording communication between the bottom of the inner groove 65 and the outer face 64 of the by-pass spool 6.

The by-pass spool 6 also comprises at least one through opening 660, (preferably two or four through openings regularly and angularly distributed), on each side of the opening 650. These openings 660 communicate at one end with the annular groove 66 and at the other end with the annular grooves 24. Moreover, the outer face 64 of the by-pass spool 6 is provided with two annular grooves 640 of X-X' axis, each of said annular groove 640 being located between the central opening 650 and one of the lateral openings 660.

The by-pass spool 6 is provided with return means, in this case a compression helical spring 67.

The bore 20 of the valve body 2' is closed at its both ends by a cover 28 (on the left side of FIG. 26) and a cover 29 (on the right side of FIG. 26). O-rings 280, 290 are mounted respectively between the covers 28, 29 and the valve body 2' to ensure the tightness of the bore 20. The cover 29 comprises an annular inner passageway 291 for receiving the spring 67.

Figure 24:
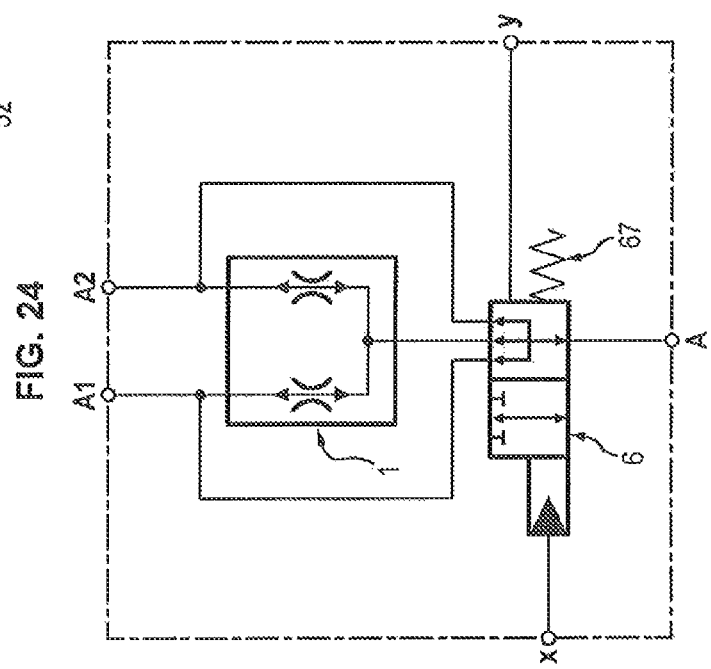

The spring 67 tends permanently to position said by-pass spool 6 in a "by-pass position" represented on FIGS. 24 and 26, i.e. a position where the end of the by-pass spool 6 opposite to the spring 67 abuts against the cover 28.

Figure 25:
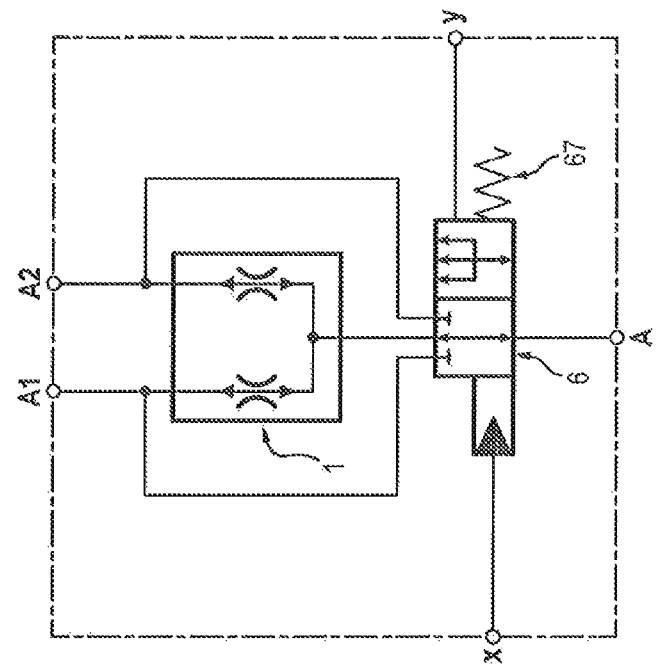
FIGS. 24 and 25 are circuit diagrams representing the flow control valve of FIG. 26 in two different positions of the by-pass spool.

The by-pass spool 6 can be displaced by signal pressure on x port (see FIGS. 24 and 25) against the return force of the spring 67, slightly on the right side of FIG. 26 to be put in a "working position" represented on FIG. 25.

In both positions of the by-pass spool 6, the openings 660 are in register with the annular grooves 24 and the central opening 650 is in register with the central annular groove 23.

In the "by-pass position" represented on FIG. 26, the two annular grooves 640 are respectively in register with the two annular grooves 27 provided inside the valve body 2'. In this case, the flow of hydraulic fluid entering the first port 21 is directed toward the annular grooves 24 via the annular grooves 23 and 27 and then toward the two ports 22, therefore by-passing the outer spool 3 and the two inner spools 4.

To the contrary, when the by-pass spool 6 is in "working position", with the spring 67 in compressed state and the spool 6 shifted toward the right, then the parts of the outer face 64 of the by-pass spool 6 located near the right side of the left opening 660 and near the right side of the central opening 650 are in register with the bottom of the annular grooves 27, therefore closing the fluid communication between the annular groove 23 and the two annular grooves 24. In this position, and as represented on FIG. 25, the flow of hydraulic fluid is directed toward the outer spool 3 and the two inner spools 4. In this case the flow control valve works in flow-dividing mode and in flow-combining mode as previously described.

In a second embodiment not represented on the figures, the outer spool 6 can be disposed inside an additional longitudinally extending bore, provided in the valve body 2', parallel to said first bore 20.

In the "by-pass position", said by-pass spool is positioned inside the additional bore to send the hydraulic fluid directly towards the port 22. To the contrary, in its "working position", the by-pass spool leads the flow of hydraulic fluid in the first port 21 and the flow-control valve works as explained with the valve 1 of FIGS. 1 and 2.

The flow control valve 1' provided with a by-pass spool 6 coaxial to the outer spool 3 and which has been described in conjunction with FIG. 26 can also be used, coupled to an additional control spool 7. The whole constitutes a flow control valve referenced 1" and illustrated in FIG. 32.

The fact of having assembly with the concentric dividing and by-pass spools, such as illustrated in FIG. 26, heightens the compactness and consequently easily adds a third spool in parallel into the same body to obtain three different functions.

Figure 32:
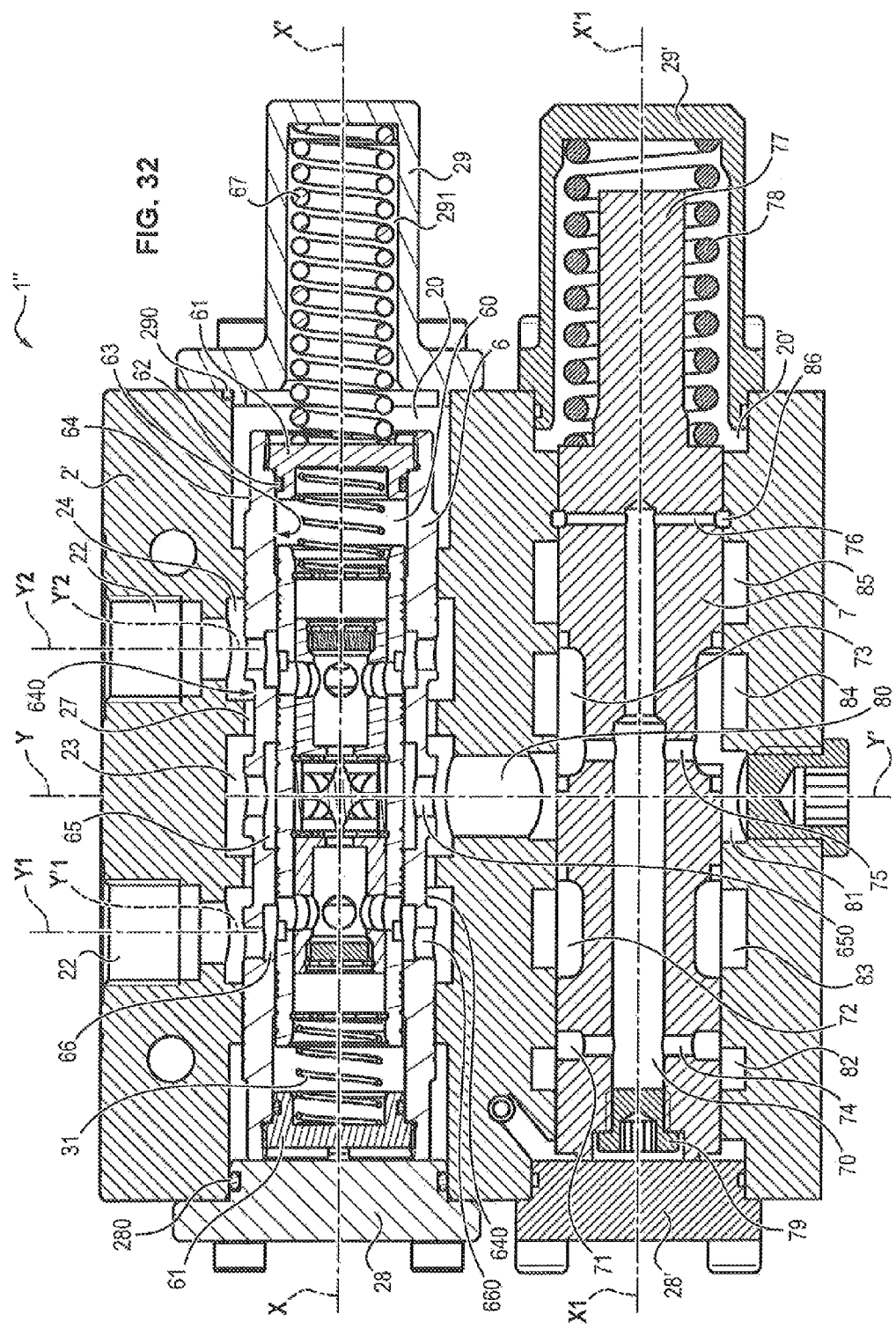
FIG. 32 is a view in longitudinal section of a third embodiment of the flow control valve according to the invention, which comprises a control spool.

The upper part of the valve 1" in FIG. 32 is identical to the valve 1' described in conjunction with FIG. 26 and the same reference numerals are used to designate identical elements. Only the lower part will be described in more detail. The valve body is referenced 2".

The control spool 7 is a cylindrical element slidably mounted inside a second cylindrical bore 20', arranged inside the valve body 2".

The control spool 7 illustrated is a so-called "freewheeling" spool. This spool 7 could be any other spool, such as especially a front step/rear step selection spool.

The second bore 20' extends according to a longitudinal axis X1-X'1 parallel to the longitudinal axis X-X' of the first bore 20.

These two bores 20 and 20' are connected together by at least one connecting port 80 which extends preferably according to the axis Y-Y'.

The connecting port 80 opens out both in an annular groove 81 made on the inner wall of the second bore 20' and also in the annular groove 23.

The valve body 2" also comprises two annular grooves on either side of the annular groove 81. These annular grooves are referenced respectively 82 and 83 for those located to the left in FIGS. 32, 84 and 85 for those located to the right. Finally, a third annular groove 86, narrower than the others, is made to the right of the groove 85. All these annular grooves open out inside the bore 20'.

The annular grooves 82, 83, 84 and 85 are each respectively connected to orifices opening out outside the valve body 2' and not visible in FIG. 32.

The control spool 7 comprises an axial central channel 70 from one of its ends and over part of its length.

The control spool 7 also has over its outer surface three annular grooves referenced successively from left to right 71, 72 and 73.

The annular grooves 71 and 73 are in fluid communication with the central channel 70 via lumens referenced respectively 74 and 75.

Finally, the central channel 70 is connected to its cylindrical outer wall by at least one lumen 76.

The control spool 7 has at one of its ends, here to the right in FIG. 32, a cylindrical head 77, of lesser diameter, around which is arranged a helicoidal compression spring 78. This spring 78 is retained at one of its ends by the spool 7 and at the other by a hollow cover 29'.

The channel 70 opens out at the opposite end of the head 77 and is blocked by a stopper 79.

Moreover, the bore 20' is also blocked by a cover 28'.

The helicoidal spring 78 constitutes return means which permanently tend to return the control spool 7 to a so-called "deactivation" position which is that illustrated in FIG. 32.

In this deactivation position the annular grooves 83 and 85 (and also the ports therethrough facing the outside to which they are connected), are insulated from the connecting port 80. Also, the annular groove 73 is located facing the connecting port 80 and the annular groove 84. As a consequence, the orifice 80 is in fluid communication with the groove 84 and via the lumen 75 with the channel 70 and with the annular groove 82.

The control spool 7 can be moved against the force exerted by the spring 78, by introduction of hydraulic fluid at the end of the bore 20' located facing the cover 28'. It moves to the right in FIG. 32 to occupy a so-called "activation" position.

In this activation position, the connecting port 80 is in fluid connection with the annular groove 83 and the port therethrough towards the outside to which it is connected. Also, the annular groove 84 is in fluid connection with the annular groove 85 via the annular groove 73 of the control spool 7.

Figure 31:
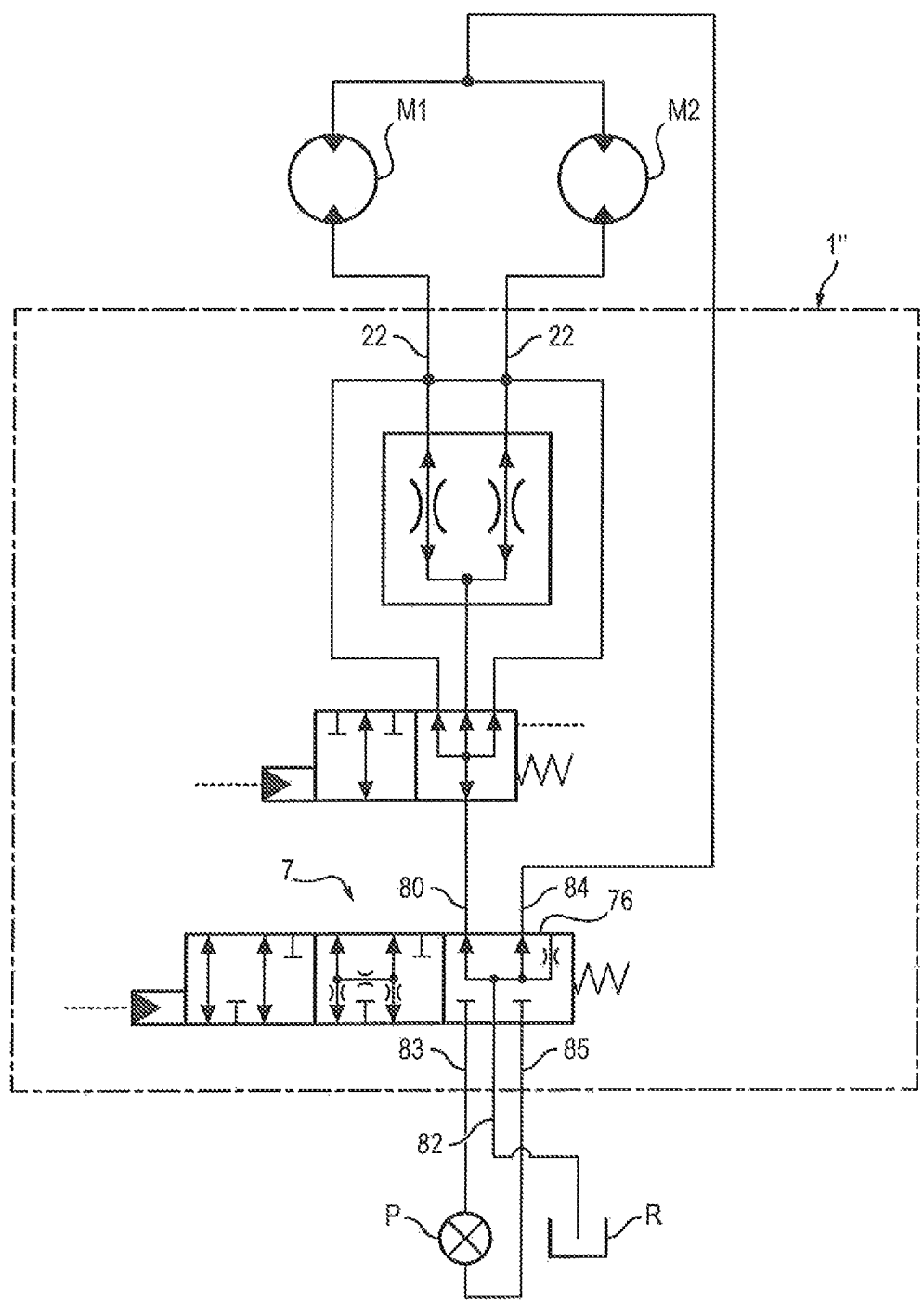
FIG. 31 is a hydraulic circuit diagram showing the flow control valve of FIG. 32.

FIG. 31 shows an example of application of the flow control valve 1", given purely by way of illustration. This application relates to hydraulic assistance of vehicle wheels.

In this case, two hydraulic motors M1 and M2 are attached respectively to two vehicle wheels, the latter not being illustrated in the figures. Each of these hydraulic motors is connected both to one of the second ports 22 therethrough and also to a port joining the annular groove 84.

Also, a pump P of the hydraulic control circuit of these motors is attached both to the port opening out in the annular groove 83 and also to that opening out in the annular groove 85. Finally, the annular groove 82 is attached to a tank R of hydraulic fluid.

The spool 7 is called "freewheeling" spool of the hydraulic motors, (of course, it could be any other spool, such as especially a front/rear step selection spool).

The above hydraulic device creates hydraulic assistance for vehicle wheels or on the contrary places these wheels in freewheeling operating mode when the control spool is in the deactivated position.

This type of assembly combines three different functions in the same valve body 2", here the flow divider/combiner function, the by-pass function of the divider/combiner and the freewheeling function of the motors.

Such a type of assembly is advantageous as it has several spools in the same body and avoids making and machining two separate bodies and connecting them by pipes.

Even though this has not been illustrated in the figures, it is also possible to make a flow control valve coupling the above control spool 7 with the variant embodiment of the control valve in which the by-pass spool 6 is placed in an additional bore separate from the first bore 20. In this case, there are three parallel bores.

Tests

Tests were conducted to register the pressure differences ΔP between the left end of the bore 20 surrounding the spring 31 and the port 21 as a function of different flow rates FR of hydraulic fluid inside a flow control valve according to the prior art when this valve operates in combining mode.

Figure 27:
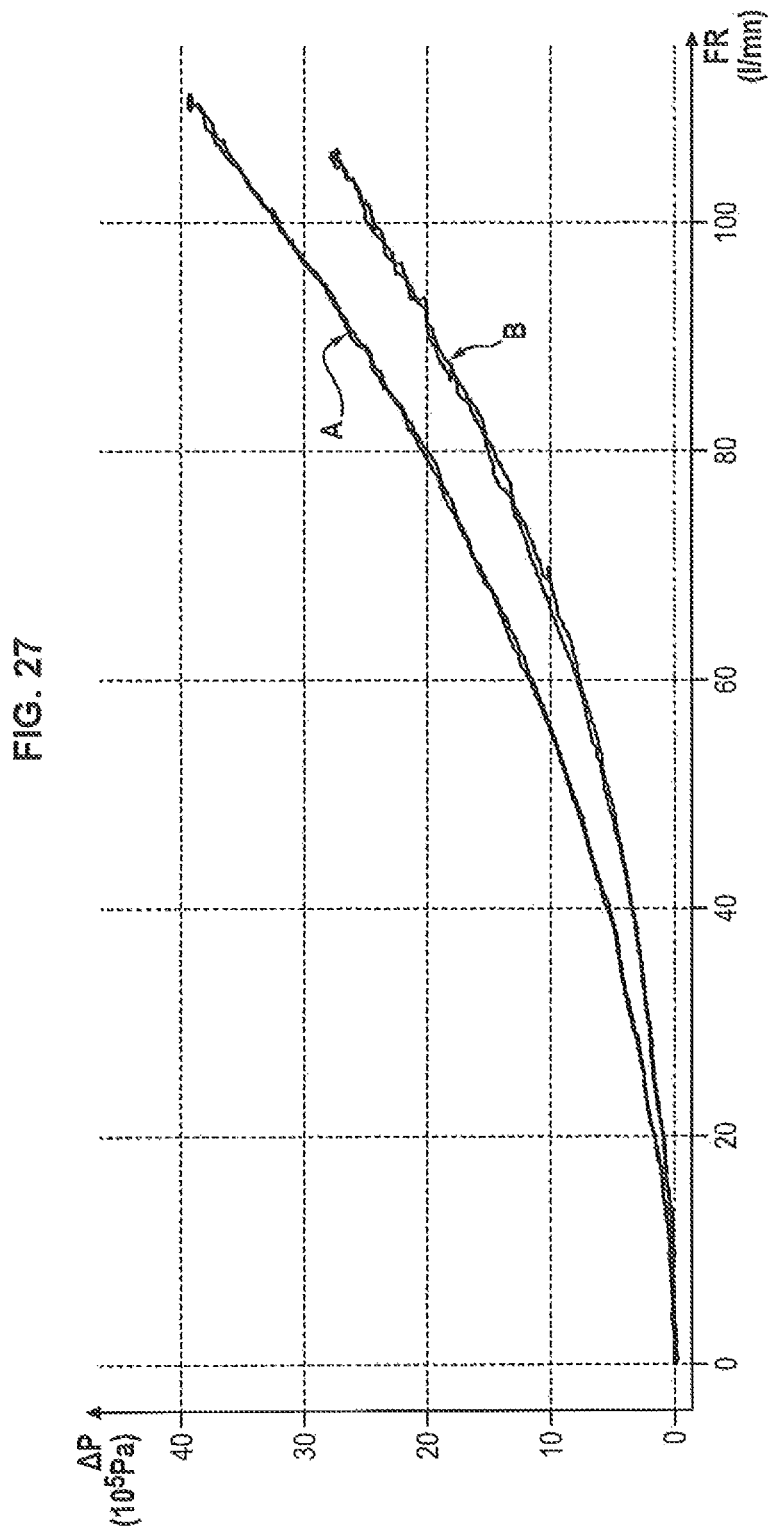
FIG. 27 is a diagram showing pressure differences ΔP between two different points of a flow control valve according to the prior art against the flow rate FR of hydraulic fluid flowing inside and this, for two boundary outer spool axial movements (two curves)

The results are represented in FIG. 27, where ΔP is expressed in $10^5$ Pascals and the flow rate FR in liter per minute. The curve A represents the results obtained when the outer spool is in middle (central) position and the curve B the results obtained when the outer spool is moved on right.

As can be seen, the two curves do not overlap.

Similar tests have been conducted with a flow control valve according to the invention such as the one represented in FIGS. 1 and 2.

Figure 28:
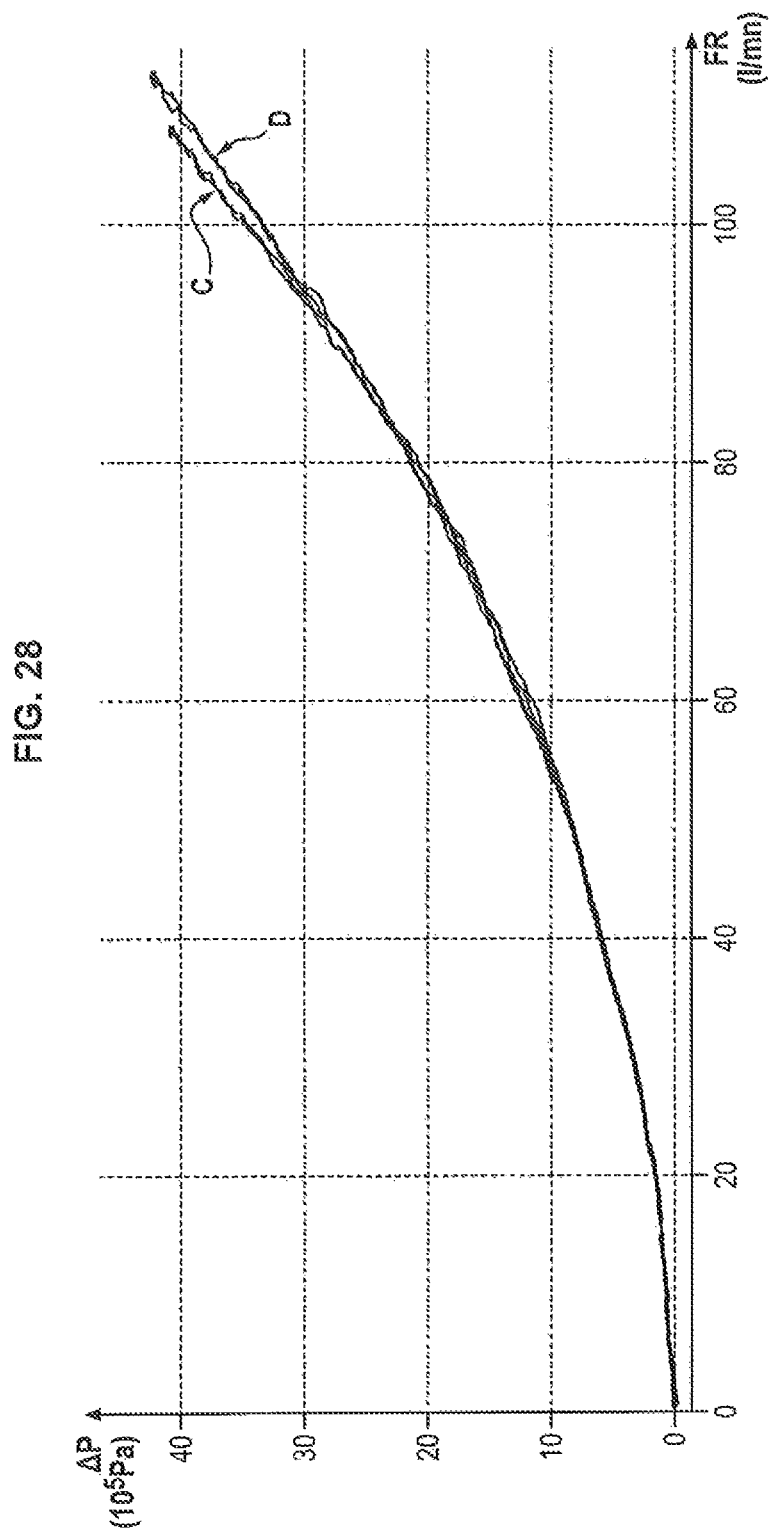
FIG. 28 is a similar diagram for a flow control valve according to the invention.

The results are shown in FIG. 28, where the curve C represents the results obtained when the outer spool 3 is in the middle position (see FIG. 1) and the curve D the results obtained when the outer spool 3 is moved on right (see FIG. 2).

As can be seen, the two curves nearly completely overlap, which means that there is less oscillations of the outer spool 3 and that the accuracy of the valve according to the invention is better.

Finally, measurements have also been done with the two aforementioned flow control valves but in dividing mode. The obtained results showed that the flow control valve according to the invention acted like the flow control valve of the prior art, which means that the amendments done on the second openings 35a have no negative influence in dividing mode.

The invention claimed is:

1. A flow control valve adapted for use as a flow-dividing and flow-combining valve in hydraulic devices, comprising:
   a valve body having a first bore extending longitudinally therethrough,
   an outer spool slidably positioned within said bore, said outer spool having an axially extending passageway therethrough,
   return means which position said outer spool centrally in a longitudinal direction of said bore,
   a pair of axially extending inner spools slidably positioned within the passageway provided in said outer spool, each inner spool having an axially extending passageway therethrough,
   said valve body having a first port therethrough and a pair of second ports therethrough, said first port and second ports communicating with the first bore,
   said outer spool having at least a first opening communicating at one end with the first port of said valve body and communicating at another end with a central zone of said outer spool, the outer spool also having at least two pairs of second openings therethrough, one pair on each side of said first opening, with the two openings of each pair of second openings being offset from one another in a longitudinal direction, so that for each pair at least one of said second openings is in communication with one of said second ports, depending on an axial position of the outer spool, in the first bore,
   each inner spool having at least one opening therein arranged to be in register with one of the two openings of one of the at least two pairs of second openings of said outer spool, depending on an axial position of said inner spool, for affording a flow path from the passageway within said inner spool to the second port in said valve body,
   wherein at least one opening of each pair of second openings of the outer spool comprises a central drill and at least one peripheral blind drill which opens out only on an outer face of the outer spool, the blind drill either partially overlaps the central drill or is spaced apart from the central drill and joined to it by a channel, the channel opening out on the outer face of the outer spool, so that the blind drill offers an obstacle against which a part of a fluid flow entering said second opening from the second port abuts before coming into an axially extending passageway of the inner spool.

2. The flow control valve according to claim 1, wherein the at least one blind drill is disposed substantially along a diametrical axis of the central drill which is parallel to a longitudinal axis of the outer spool and on a side of the central drill which is nearest to an end of the outer spool.

3. The flow control valve according to claim 1, wherein each inner spool is provided with a partition wall extending transversally across the passageway therethrough, the partition wall defining at least one hole therethrough, the hole affording communication between the central zone of said outer spool and the passageway therethrough of the inner spool.

4. The flow control valve according to claim 3, wherein the partition wall comprises a central hole extending along a longitudinal axis of said inner spool and/or at least one peripheral hole extending parallel to the longitudinal axis.

5. The flow control valve according to claim 1, wherein a partition element is disposed inside the central zone of the outer spool in front of the at least one first opening to separate a flow of hydraulic liquid circulating inside the flow control valve into two flows.

6. The flow control valve according to claim 5, wherein the partition element is a portion of a tube inserted in coaxial relationship with and inside the passageway of said outer spool, the tube being provided with a plane partition wall extending in a plane transversely bisecting said tube, and the tube being provided with at least one aperture on both sides of said wall, the apertures opening in front of the first opening provided in the outer spool.

7. The flow control valve according to claim 5, wherein the partition element is a portion of a tube inserted in coaxial relationship with and inside the passageway of said outer spool, the tube being provided with a partition wall extending in a plane transversely bisecting said tube, and the tube being provided with at least one aperture on both sides of said wall, the apertures opening in front of the first opening provided in the outer spool, said partition wall being provided with two cones disposed on the partition wall such that the respective bases of the cones are in contact with said partition wall.

8. The flow control valve according to claim 1, further comprising a by-pass spool.

9. The flow control valve according to claim 8, wherein said by-pass spool is in coaxial relationship with the outer spool and is mounted outside of said outer spool and inside the first bore of the valve body, said by-pass spool being slidably positioned within said first bore.

10. The flow control valve according to claim 8, wherein said by-pass spool is slidably positioned within an additional longitudinally extending bore provided in said valve body parallel to said first bore of the valve body.

11. The flow control valve according to claim 9, further comprising a control spool slidably mounted inside a second bore of the valve body, the second bore being parallel to the first bore, the first bore and the second bore being connected by at least one connecting port.

12. The flow control valve according to claim 10, further comprising a control spool slidably mounted inside a second bore of the valve body, the second bore extending in a direction parallel to the first bore, the first bore and the second bore being connected by at least one connecting port.

13. The flow control valve according to claim 11, wherein said control spool is moveable between an "activation" position in which the control spool connects the two second ports of the valve body to a hydraulic pump of a hydraulic device and a "deactivation" position in which the control spool connects the two second ports of the valve body to a tank of hydraulic fluid of a hydraulic device.

14. The flow control valve according to claim 12, wherein said control spool is moveable between an "activation" position in which the control spool connects the two second ports of the valve body to a hydraulic pump of a hydraulic device and a "deactivation" position in which it connects the two second ports of the valve body to a tank of hydraulic fluid of a hydraulic device.

15. A flow control valve adapted for use as a flow-dividing and flow-combining valve in hydraulic devices, comprising:
- a valve body having a first bore extending longitudinally therethrough,
- an outer spool slidably positioned within said bore, said outer spool having an axially extending passageway therethrough,
- springs which position said outer spool centrally in a longitudinal direction of said bore,
- a pair of axially extending inner spools slidably positioned within the passageway provided in said outer spool, each inner spool having an axially extending passageway therethrough,
- said valve body having a first port therethrough and a pair of second ports therethrough, said first port and second ports communicating with the first bore,
- said outer spool having at least a first opening communicating at one end with the first port of said valve body and communicating at another end with a central zone of said outer spool, the outer spool also having at least two pairs of second openings therethrough, one pair on each side of said first opening, with the two openings of each pair of second openings being offset from one another in a longitudinal direction, so that for each pair at least one of said second openings is in communication with one of said second ports, depending on an axial position of the outer spool, in the first bore,
- each inner spool having at least one opening therein arranged to be in register with one of the two openings of one of the at least two pairs of second openings of said outer spool, depending on an axial position of said inner spool, for affording a flow path from the passageway within said inner spool to the second port in said valve body,
- wherein at least one opening of each pair of second openings of the outer spool comprises a central drill and at least one peripheral blind drill which opens out only on an outer face of the outer spool, the blind drill either partially overlaps the central drill or is spaced apart from the central drill and joined to it by a channel, the channel opening out on the outer face of the outer spool, so that the blind drill offers an obstacle against which a part of a fluid flow entering said second opening from the second port abuts before coming into an axially extending passageway of the inner spool.

* * * * *